(12) United States Patent
Park et al.

(10) Patent No.: US 10,356,753 B2
(45) Date of Patent: Jul. 16, 2019

(54) SUPPRESSING WIRELESS BROADCAST/MULTICAST DATA TRANSMISSIONS

(71) Applicant: QUALCOMM Incorporated, San Diego, CA (US)

(72) Inventors: Vincent Douglas Park, Budd Lake, NJ (US); Junyi Li, Chester, NJ (US); Zhibin Wu, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 13/656,564

(22) Filed: Oct. 19, 2012

(65) Prior Publication Data

US 2014/0112163 A1    Apr. 24, 2014

(51) Int. Cl.
*H04W 72/00* (2009.01)
*H04W 74/00* (2009.01)
(Continued)

(52) U.S. Cl.
CPC ................................ *H04W 72/005* (2013.01)

(58) Field of Classification Search
CPC ........... H04W 72/005; H04W 74/0816; H04W 74/008; H04W 72/12
(Continued)

(56) References Cited

U.S. PATENT DOCUMENTS 6,665,311 B2    12/2003    Kondylis et al.
2006/0114941 A1 *    6/2006    Silverman et al. ........... 370/503
(Continued)

FOREIGN PATENT DOCUMENTS

CN    101005424 A    7/2007
JP    2012506163 A    3/2012
(Continued)

OTHER PUBLICATIONS

Xuejun, et al, "Multichannel time-spread scheduling: a new approach to handling heavy traffic loads in ad hoc networks", Wireless Communications and Networking Conference, 2004. WCNC. 2004 IEEE, 6pgs.
(Continued)

*Primary Examiner* — Xavier Szewai Wong
(74) *Attorney, Agent, or Firm* — Arent Fox, LLP

(57) ABSTRACT

A method, an apparatus, and a computer program product for wireless communication are described. The apparatus wirelessly transmits a reservation signal intended for a plurality of receivers for scheduling a broadcast/multicast data transmission, monitors for a confirmation signal from at least one of the plurality of receivers, wirelessly transmits the broadcast/multicast data transmission to the plurality of receivers if the confirmation signal is received, and suppresses transmission of the broadcast/multicast data to the plurality of receivers if the confirmation signal is not received. In some embodiments, the apparatus further determines at least one of a number of received confirmation signals or a signal strength of a received confirmation signal from the at least one of the plurality of receivers, and suppresses transmission of the broadcast/multicast data based on the determined at least one of the number of received confirmation signals or the signal strength of the received confirmation signal.

30 Claims, 14 Drawing Sheets

(51) Int. Cl.
*H04W 4/06* (2009.01)
*H04L 1/20* (2006.01)

(58) Field of Classification Search
USPC .................................. 370/252, 312, 329, 338
See application file for complete search history.

(56) References Cited

U.S. PATENT DOCUMENTS

| | | |
|---|---|---|
| 2007/0165587 A1 | 7/2007 | Choi |
| 2008/0049771 A1 | 2/2008 | Acharya et al. |
| 2008/0089263 A1* | 4/2008 | Tsutsumi ............ H04L 12/1886 370/312 |
| 2008/0144493 A1* | 6/2008 | Yeh ....................... H04W 52/50 370/230 |
| 2009/0129330 A1* | 5/2009 | Kim ..................... H04L 1/0025 370/329 |
| 2010/0183027 A1 | 7/2010 | Mueller |
| 2010/0322130 A1* | 12/2010 | Gong .................... H04W 28/12 370/312 |
| 2011/0096711 A1 | 4/2011 | Liu et al. |
| 2011/0249659 A1* | 10/2011 | Fontaine et al. .............. 370/338 |
| 2012/0008570 A1* | 1/2012 | Li et al. ....................... 370/329 |
| 2012/0051318 A1 | 3/2012 | Seok |
| 2012/0076073 A1 | 3/2012 | Merlin et al. |

FOREIGN PATENT DOCUMENTS

| | | |
|---|---|---|
| WO | 2007091738 A1 | 8/2007 |
| WO | 2009157910 A1 | 12/2009 |

OTHER PUBLICATIONS

International Search Report and Written Opinion—PCT/US2013/064363—ISA/EPO—dated Feb. 4, 2014.
Wu X., et al., "FlashLinQ: A Synchonous Distributed Scheduler for Peer-to-Peer Ad Hoc Networks", IEEE/ACM Transaction on Networking, IEEE, vol. 21, Issue 4, Jun. 19, 2013 pp. 1-14.
Wu X., et al., "FlashLinQ: A Synchronous Distributed Scheduler for Peerto-Peer ad Hoc Networks", 48th Annual Allerton Conference on Communication, Control, and Computing (Allerton), IEEE, Sep. 29, 2010 (Sep. 29, 2010), pp. 514-521, XP031899421, DOI: 10.1109/Allerton.2010.5706950, ISBN: 978-1-4244-8215-3.
European Search Report—EP17172377—Search Authority—The Hague—dated Aug. 31, 2017.

* cited by examiner

SUPPRESSING WIRELESS BROADCAST/MULTICAST DATA TRANSMISSIONS

BACKGROUND

Field

The present disclosure relates generally to communication systems, and more particularly, to suppressing a broadcast/multicast data transmission when a number of receivers interested in receiving the transmission is below a threshold.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus wirelessly transmits a reservation signal intended for a plurality of receivers for scheduling a broadcast/multicast data transmission; monitors for a confirmation signal from at least one of the plurality of receivers; wirelessly transmits the broadcast/multicast data transmission to the plurality of receivers if the confirmation signal is received; and suppresses transmission of the broadcast/multicast data to the plurality of receivers if the confirmation signal is not received.

In a further aspect of the disclosure, the apparatus wirelessly transmits a reservation signal intended for a plurality of receivers for scheduling a broadcast/multicast data transmission; monitors for a confirmation signal from at least one of the plurality of receivers; determines at least one of a number of received confirmation signals or a signal strength of a received confirmation signal from the at least one of the plurality of receivers; suppresses transmission of the broadcast/multicast data based on the determined at least one of the number of received confirmation signals or the signal strength of the received confirmation signal; and sends a retraction signal to the plurality of receivers indicating the suppression of the broadcast/multicast data transmission.

DETAILED DESCRIPTION

Figure 1:
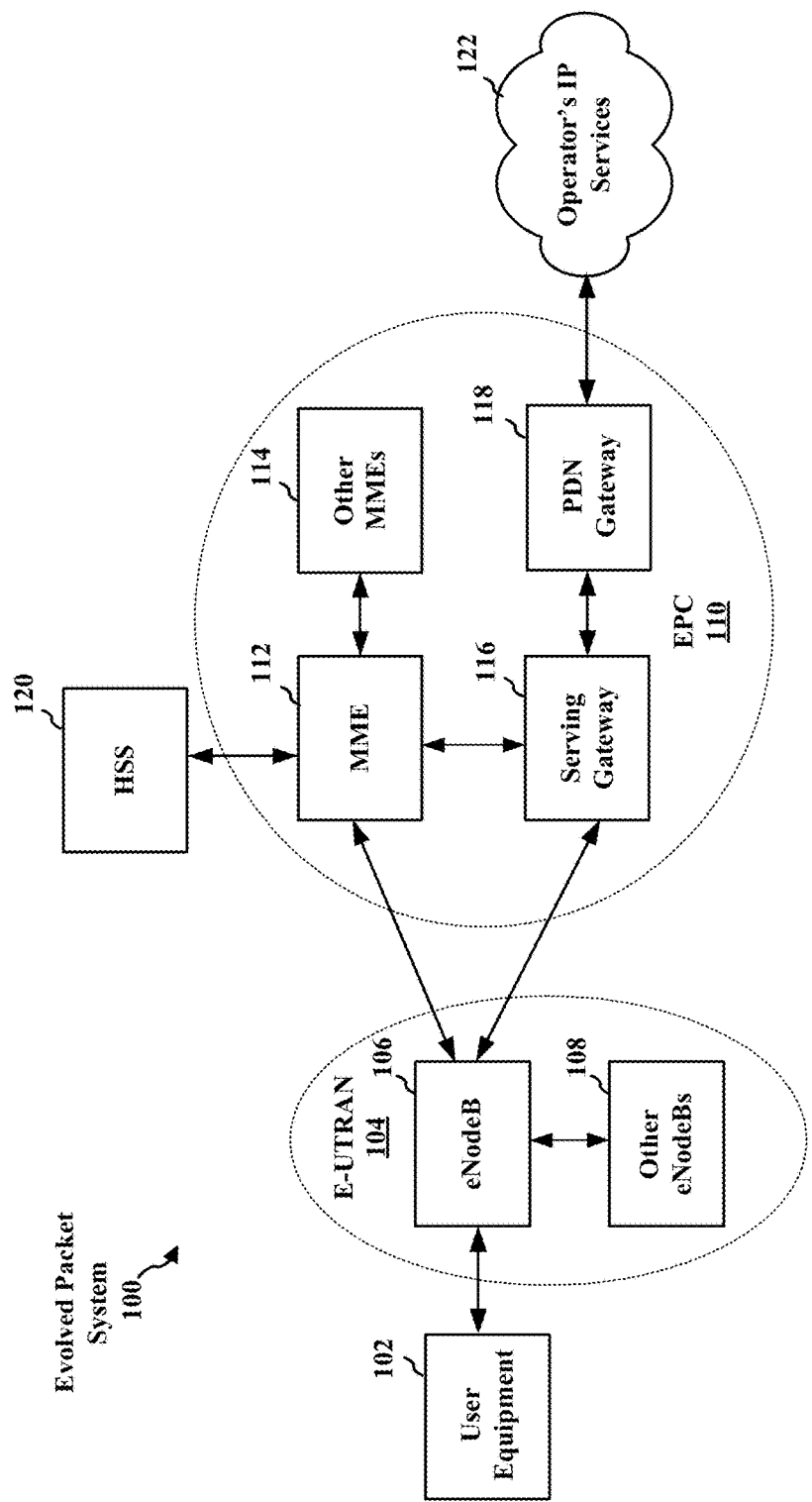
FIG. 1 is a diagram illustrating an example of a network architecture, according to one embodiment.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN 104 includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. User IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an Intranet, an IP Multimedia Subsystem (IMS), and a PS Streaming Service (PSS).

Figure 2:
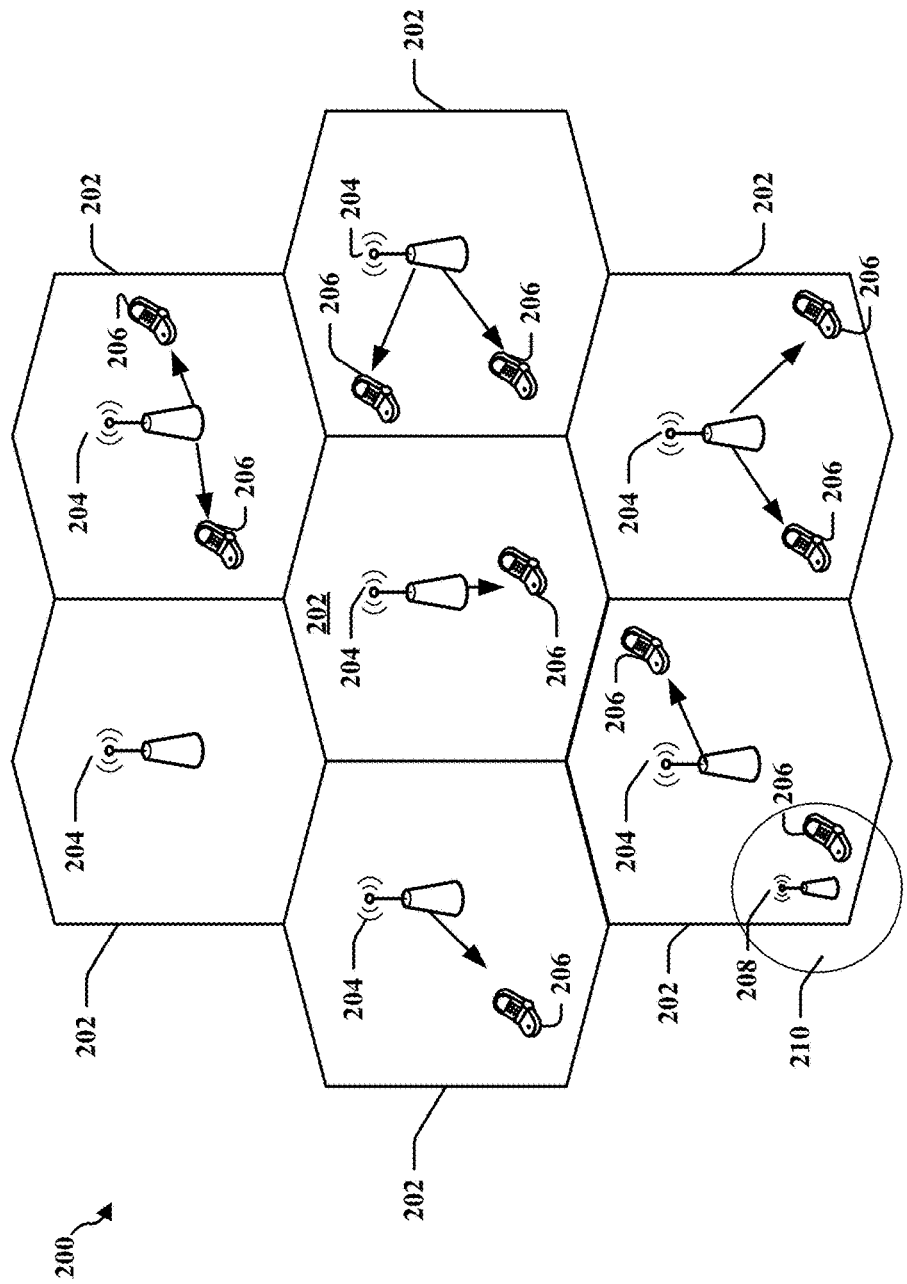
FIG. 2 is a diagram illustrating an example of an access network, according to one embodiment.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
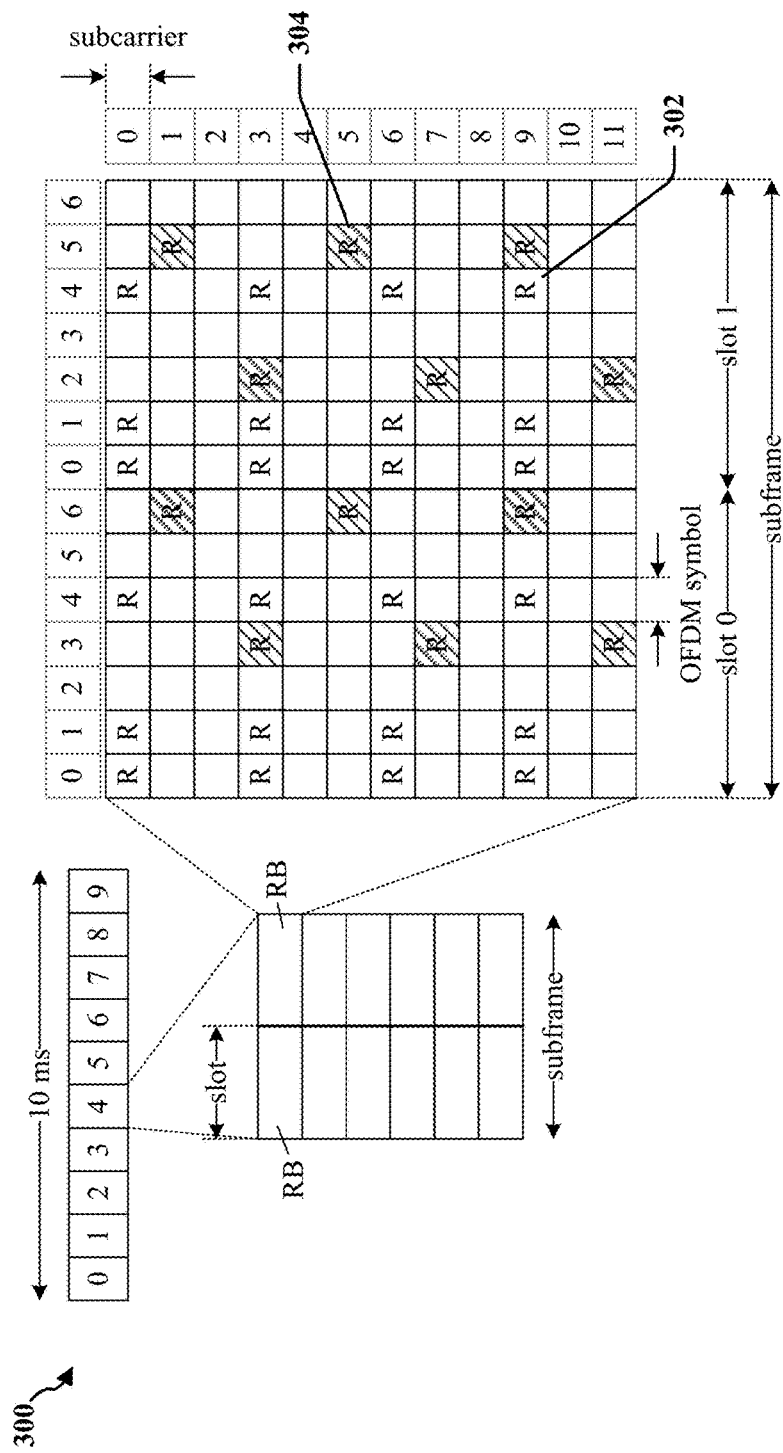
FIG. 3 is a diagram illustrating an example of a DL frame structure in LTE, according to one embodiment.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
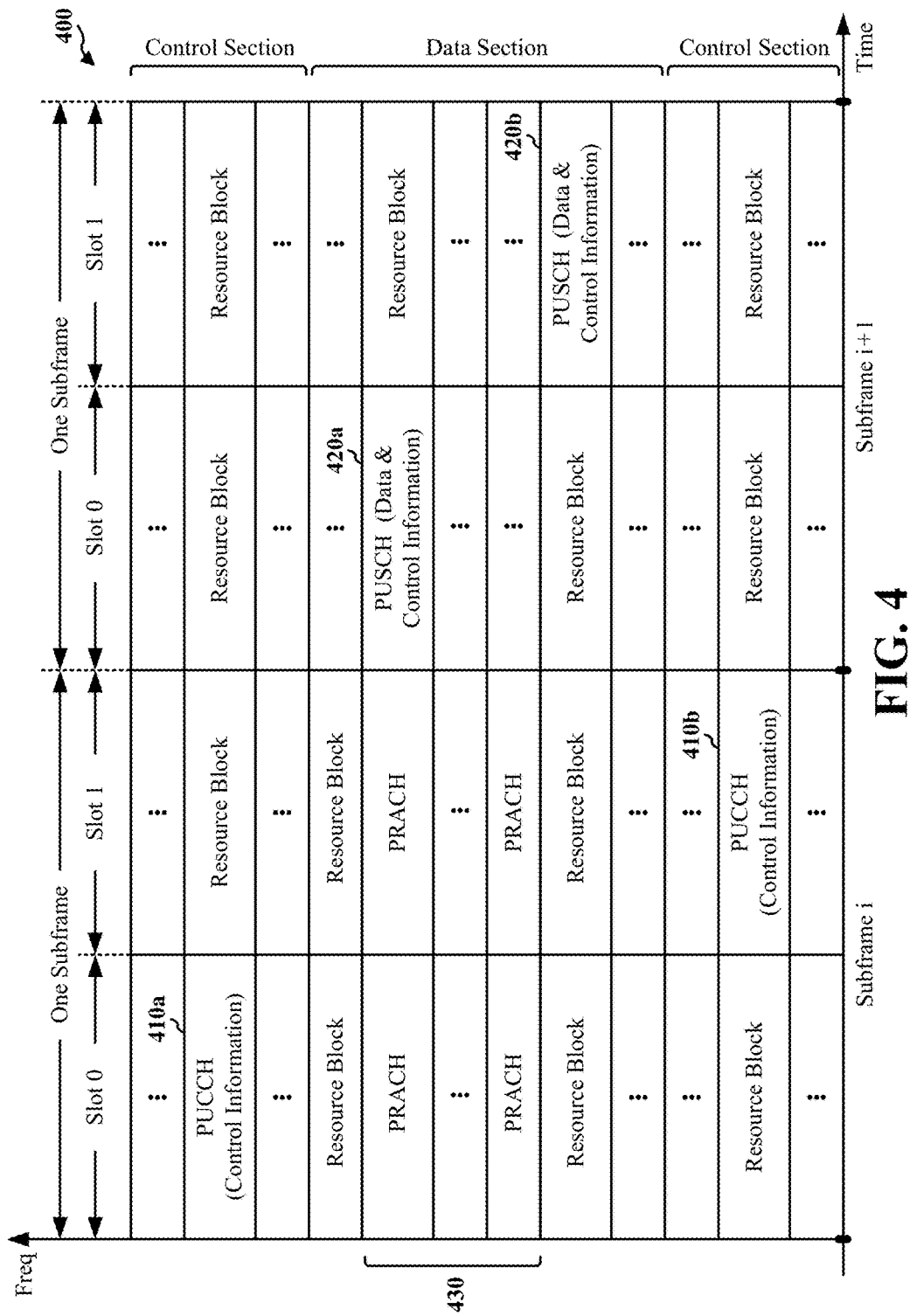
FIG. 4 is a diagram illustrating an example of an UL frame structure in LTE, according to one embodiment.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
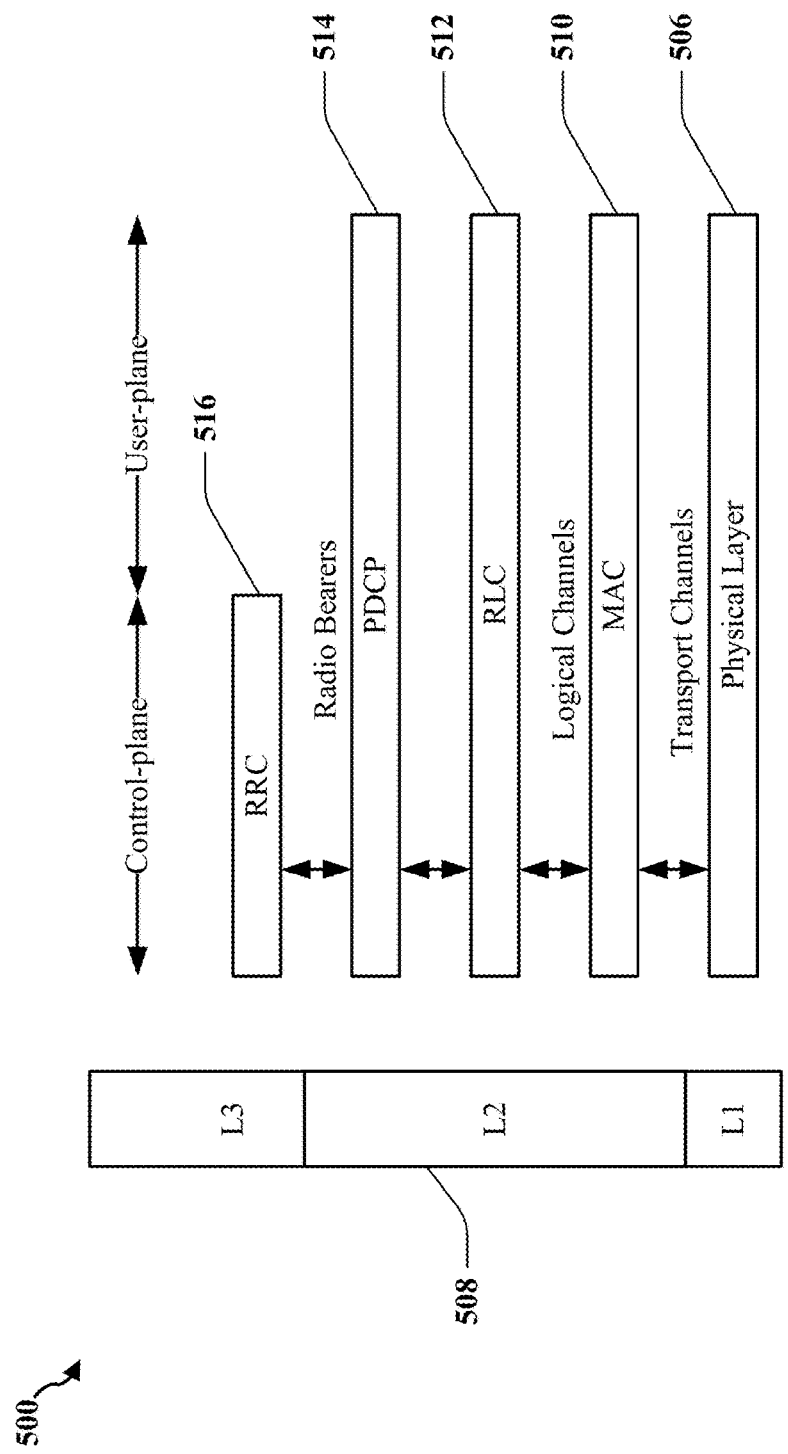
FIG. 5 is a diagram illustrating an example of a radio protocol architecture for the user and control planes, according to one embodiment.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
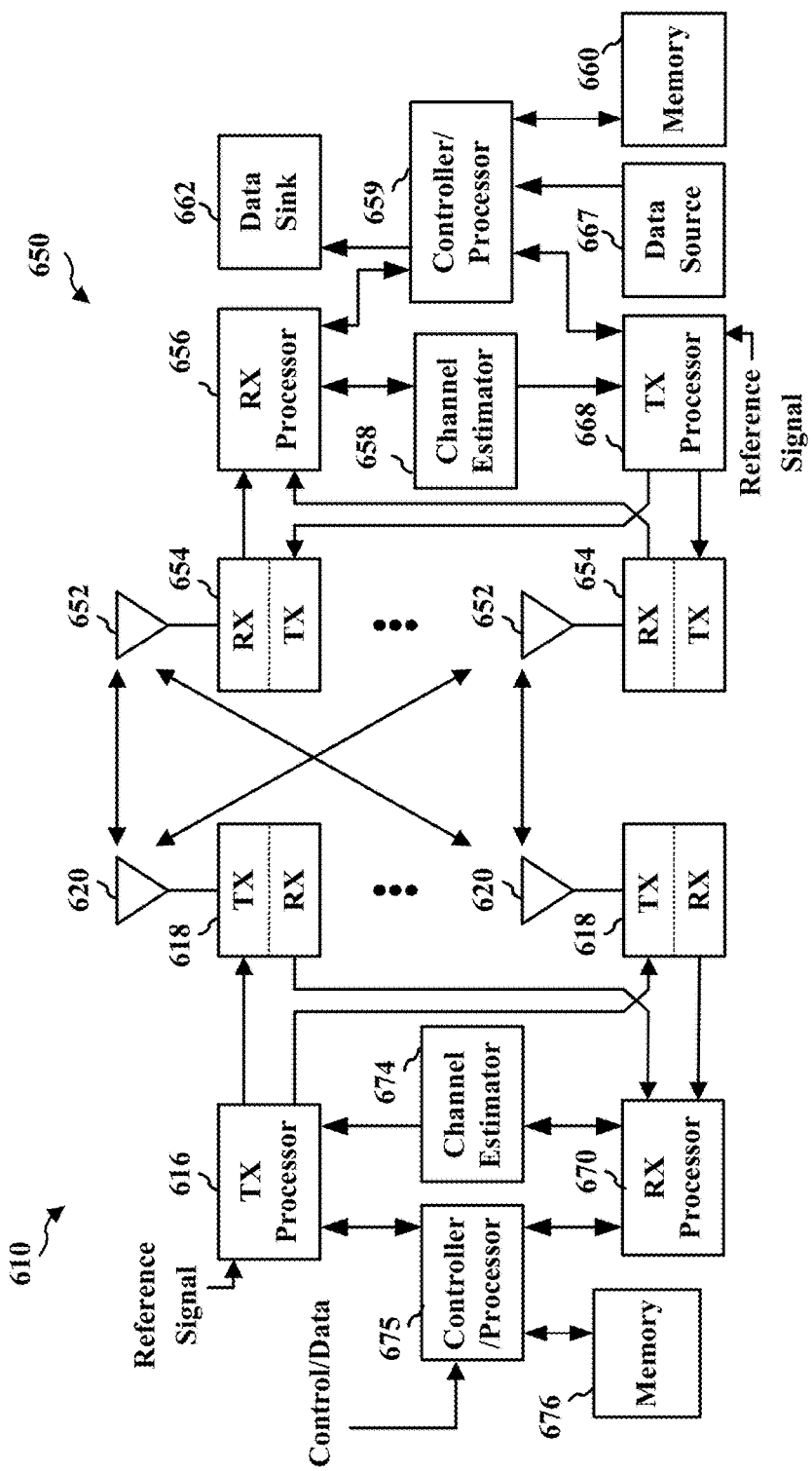
FIG. 6 is a diagram illustrating an example of an evolved Node B and user equipment in an access network, according to one embodiment.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
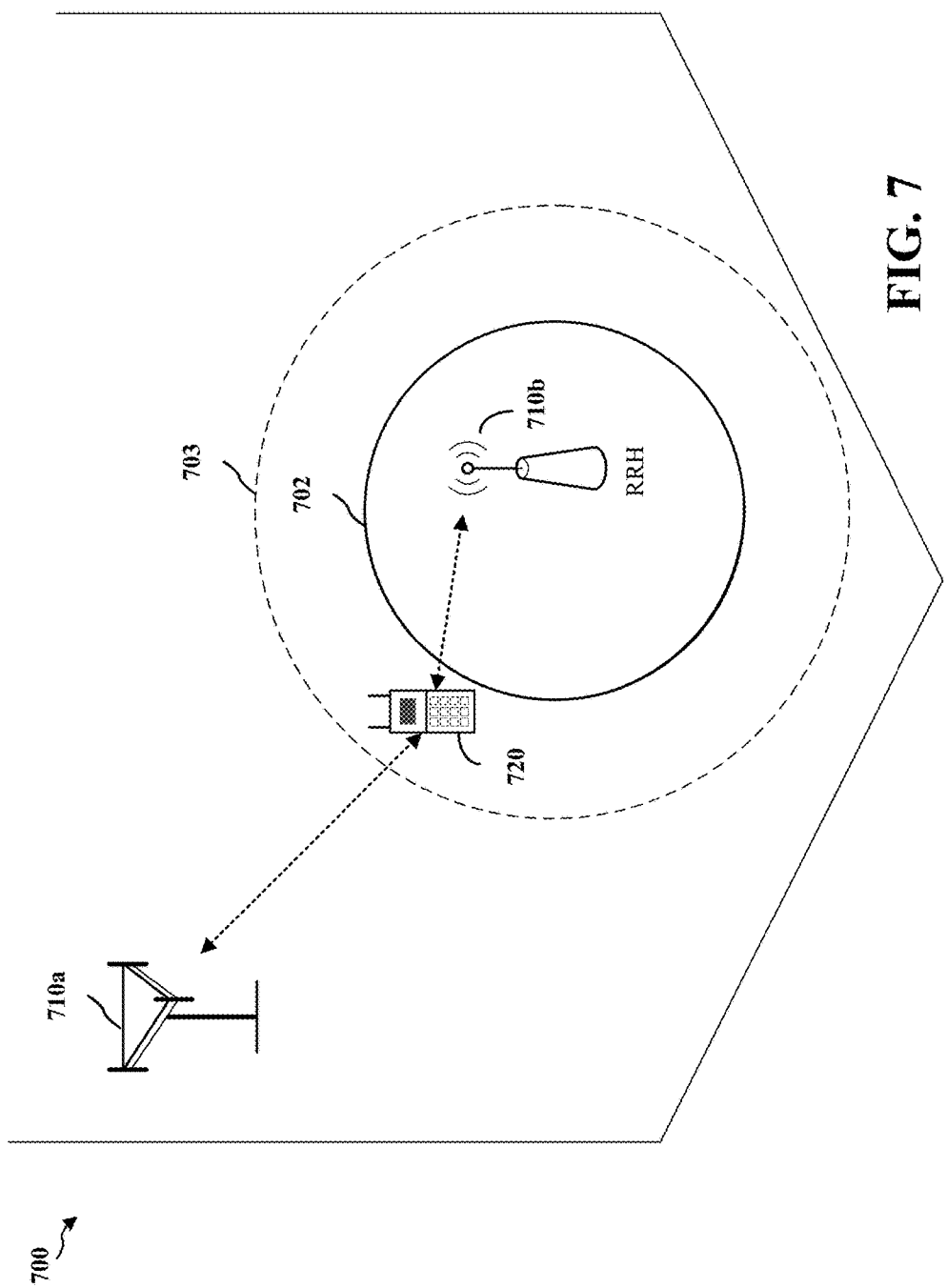
FIG. 7 is a diagram illustrating a range expanded cellular region in a heterogeneous network, according to one embodiment.

FIG. 7 is a diagram 700 illustrating a range expanded cellular region in a heterogeneous network. A lower power class eNB such as the RRH 710*b* may have a range expanded cellular region 703 that is expanded from the cellular region 702 through enhanced inter-cell interference coordination between the RRH 710*b* and the macro eNB 710*a* and through interference cancellation performed by the UE 720. In enhanced inter-cell interference coordination, the RRH 710*b* receives information from the macro eNB 710*a* regarding an interference condition of the UE 720. The information allows the RRH 710*b* to serve the UE 720 in the range expanded cellular region 703 and to accept a handoff of the UE 720 from the macro eNB 710*a* as the UE 720 enters the range expanded cellular region 703.

Figure 8:
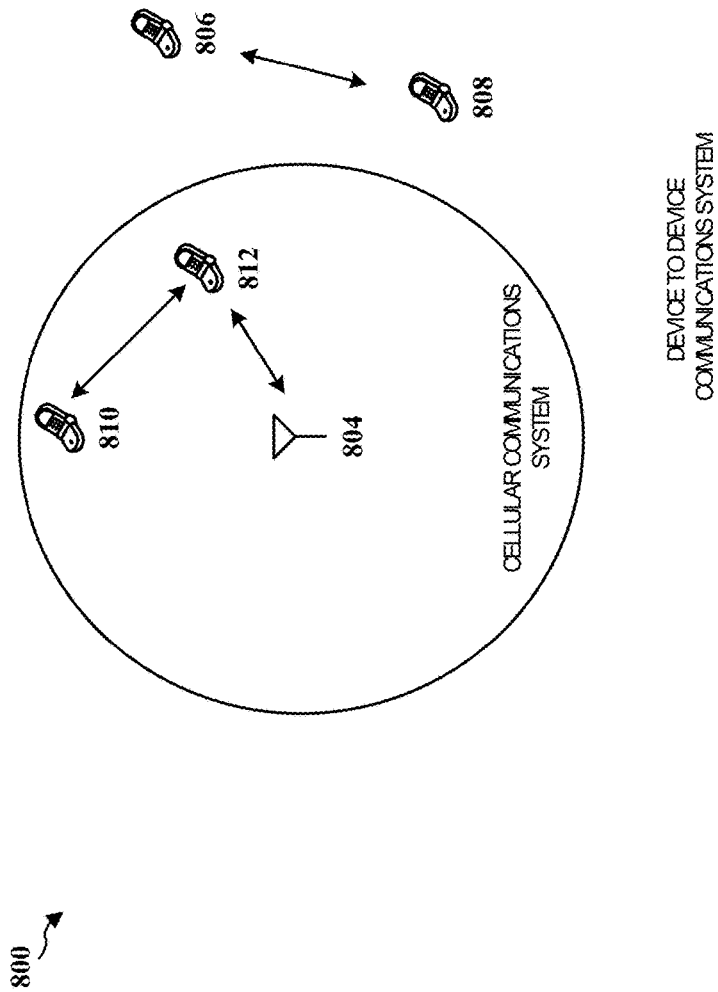
FIG. 8 is a diagram of an exemplary device-to-device (D2D) communications system, according to one embodiment.

FIG. 8 is a diagram 800 of an exemplary device-to-device (D2D) communications system. The device-to-device communications system 800 includes a plurality of wireless devices 806, 808, 810, 812. The device-to-device communications system 800 may overlap with a cellular communications system, such as for example, a wireless wide area network (WWAN). Some of the wireless devices 806, 808, 810, 812 may communicate together in device-to-device communication, some may communicate with the base station 804, and some may do both. For example, as shown in FIG. 8, the wireless devices 806, 808 are in device-to-device communication and the wireless devices 810, 812 are in device-to-device communication. The wireless device 812 is also communicating with the base station 804.

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. One of ordinary skill in the art would understand that the exemplary methods and apparatuses are applicable more generally to a variety of other wireless device-to-device communication systems.

In an aspect, a wireless broadcast or multicast data transmission in a link layer may be conducted without considering receiver availability. For example, in an IEEE 802.11 MAC layer, a broadcast packet may be sent to potential receivers in the absence of a negotiation mechanism between a sender and the potential receivers. Since there is no negotiation mechanism, the transmitter might not know ahead of time if any receivers are positioned to receive a broadcast packet and thus the transmitter may transmit a broadcast packet even though no receivers are within communication range of the transmitter. Hence, without receiving consent of the receivers for a transmission, a packet may be transmitted without being successfully decoded by a single receiver. This wastes channel resources and reduces the efficiency of the system.

In the present disclosure, a scheduling phase may be provided prior to a broadcast/multicast data transmission. Here, a broadcast transmission may refer to transmitting information to be received by all devices on a network. A multicast transmission may refer to transmitting information to be received by a specific group of devices on the network. Hence, the broadcast/multicast data transmission may refer to a signal or message that is transmitted to a plurality of endpoints. In particular, the broadcast/multicast data transmission may be transmitted once to be received by a plurality of receivers at, or near, the same time. In some embodiments, the broadcast/multicast data transmission may include a broadcast/multicast address or other information distinguishing the broadcast/multicast data transmission from other transmissions intended for a single endpoint.

During the scheduling phase, the sender will indicate its desire to send a broadcast/multicast data transmission to some or all of its local neighboring receivers by sending a scheduling request. If any of the receivers agree with a scheduling arrangement indicated by the scheduling request, the receiver(s) will acknowledge the request with a response. If none of the receivers acknowledges availability, then the sender will suppress transmission of its broadcast/multicast data. The sender may later attempt to reach the receivers using a subsequent scheduling request.

Use of the scheduling phase is beneficial as it avoids meaningless transmission and saves channel resources. When the sender suppresses the attempt to send data, the sender frees channel resources for other senders in the proximity to utilize for their respective needs (e.g., for unicast, broadcast or multicast transmissions).

Figures 9A, 9B:
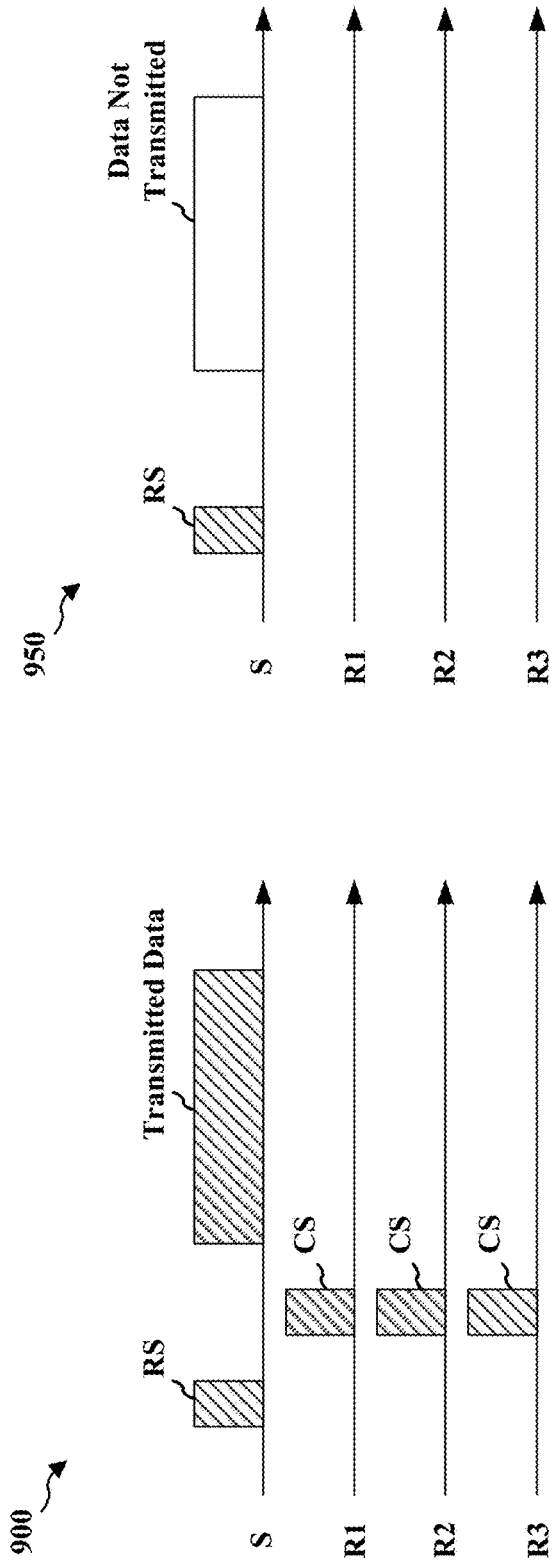
FIG. 9A is a diagram illustrating the transmission of broadcast/multicast data to receivers when at least one receiver acknowledges an availability to receive, according to one embodiment.
FIG. 9B is a diagram illustrating suppression of a broadcast/multicast data transmission when no receivers acknowledge an availability to receive, according to one embodiment.

FIG. 9A is a diagram 900 illustrating the transmission of broadcast/multicast data to receivers when at least one receiver acknowledges an availability to receive. FIG. 9B is a diagram 950 illustrating suppression of a broadcast/multicast data transmission when no receivers acknowledge an availability to receive.

Referring to FIG. 9A, a sender S may send a reservation signal (RS), such as a request to send (RTS) signal, at a certain time for scheduling (e.g., reserving resources for) a broadcast/multicast data transmission. Accordingly, any one or more of receivers R1, R2, or R3 may acknowledge an ability to receive the broadcast/multicast data transmission by responding with a confirmation signal (CS), such as a clear to send (CTS) signal. Thereafter, upon receiving the CS from any one or more of the receivers R1, R2, or R3, the sender S may transmit broadcast/multicast data to all three receivers R1, R2, and R3. In doing so, S may transmit the broadcast/multicast data once and each of the three receivers R1, R2, and R3 may independently receive the transmitted broadcast/multicast data.

Referring to FIG. 9B, a scenario is illustrated in which the sender S sends the RS for scheduling the broadcast/multicast data transmission, but none of the receivers R1, R2, or R3 acknowledge the ability to receive the broadcast/multicast data transmission. Hence, the sender S does not receive any response (i.e., CS) from the receivers R1, R2, or R3. Because no response is received, the sender S will suppress the transmission of the broadcast/multicast data since no receiver is available to receive the transmission.

In an aspect, the sender S may require each scheduled broadcast/multicast transmission to reach a minimum number of receivers. Under this condition, the sender S may count a number of available receivers (e.g., receivers that respond to an RS transmitted by sender S with a CS) and compare the number of available receivers to a predefined threshold. If the number of available receivers is less than the predefined threshold, then the sender S may suppress the scheduled broadcast/multicast transmission. The sender S may also send another signal indicating a retraction of the scheduled broadcast/multicast transmission. If the number of available receivers is greater than or equal to the predefined threshold, then the sender S may send the scheduled broadcast/multicast transmission.

In a further aspect, the sender S may require that a confirmation signal (CS) received from a receiver have a minimum signal strength. Under this condition, the sender S may compare a strength of a received CS to a predefined threshold. If the signal strength of the CS is less than the predefined threshold, then the sender S may suppress the scheduled broadcast/multicast transmission. The sender S may also send another signal indicating a retraction of the scheduled broadcast/multicast transmission. If the signal strength of the CS is greater than or equal to the predefined threshold, then the sender S may send the scheduled broadcast/multicast transmission.

Figure 10:
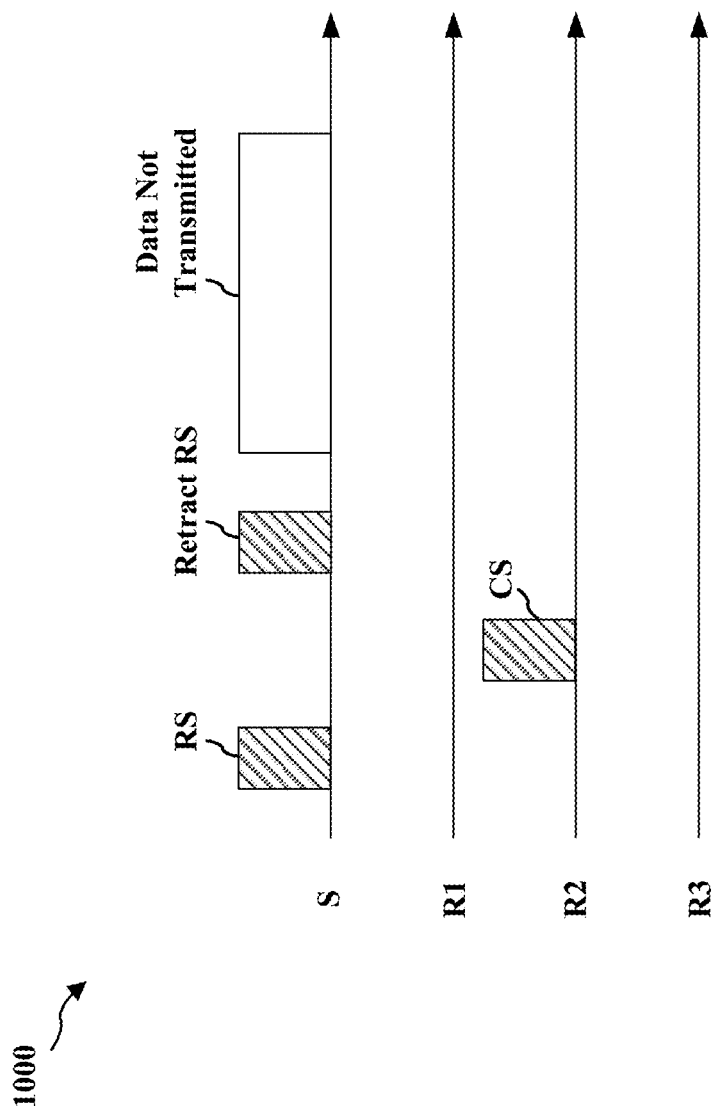
FIG. 10 is a diagram illustrating suppression of a scheduled broadcast/multicast transmission when conditions are not met, according to one embodiment.

FIG. 10 is a diagram 1000 illustrating suppression of a scheduled broadcast/multicast transmission when conditions are not met. Referring to FIG. 10, the number of receivers required by the sender S for a broadcast/multicast data transmission may be based on a predetermined threshold (e.g., 2). When the sender S sends an RS for scheduling the broadcast/multicast data transmission, the sender S may only receive a CS from one receiver (e.g., receiver R2). Accordingly, because the number of receivers acknowledging an ability to receive the data transmission is less than the predetermined threshold, the sender S may decide to discontinue (or suppress) the broadcast/multicast data transmission. To relieve the receiver R2 from its duty to receive the transmission, the sender S may send a retraction signal "Retract RS" indicating retraction of the previously-sent RS and forfeiture of the sender S's resource reservation. That is, the retraction signal indicates to the receiver R2 that sender S is no longer scheduled to send the broadcast/multicast data transmission.

Still referring to FIG. 10, the signal strength required by the sender S for the CS may be based on a predetermined threshold. When the sender S sends the RS for scheduling the broadcast/multicast data transmission, the sender S may receive a CS having a particular signal strength. Accordingly, if the particular signal strength of the received CS is less than the predetermined threshold, the sender S may decide to discontinue (or suppress) the broadcast/multicast data transmission. Thereafter, the sender S may send a retraction signal "Retract RS" to relieve the receiver R2 from its duty to receive the transmission. As stated above, the retraction signal indicates retraction of the previously-sent RS and forfeiture of the sender S's resource reservation. Upon receipt of the retraction signal, the receiver R2 is informed that sender S is no longer scheduled to send the broadcast/multicast data transmission.

Figure 11:
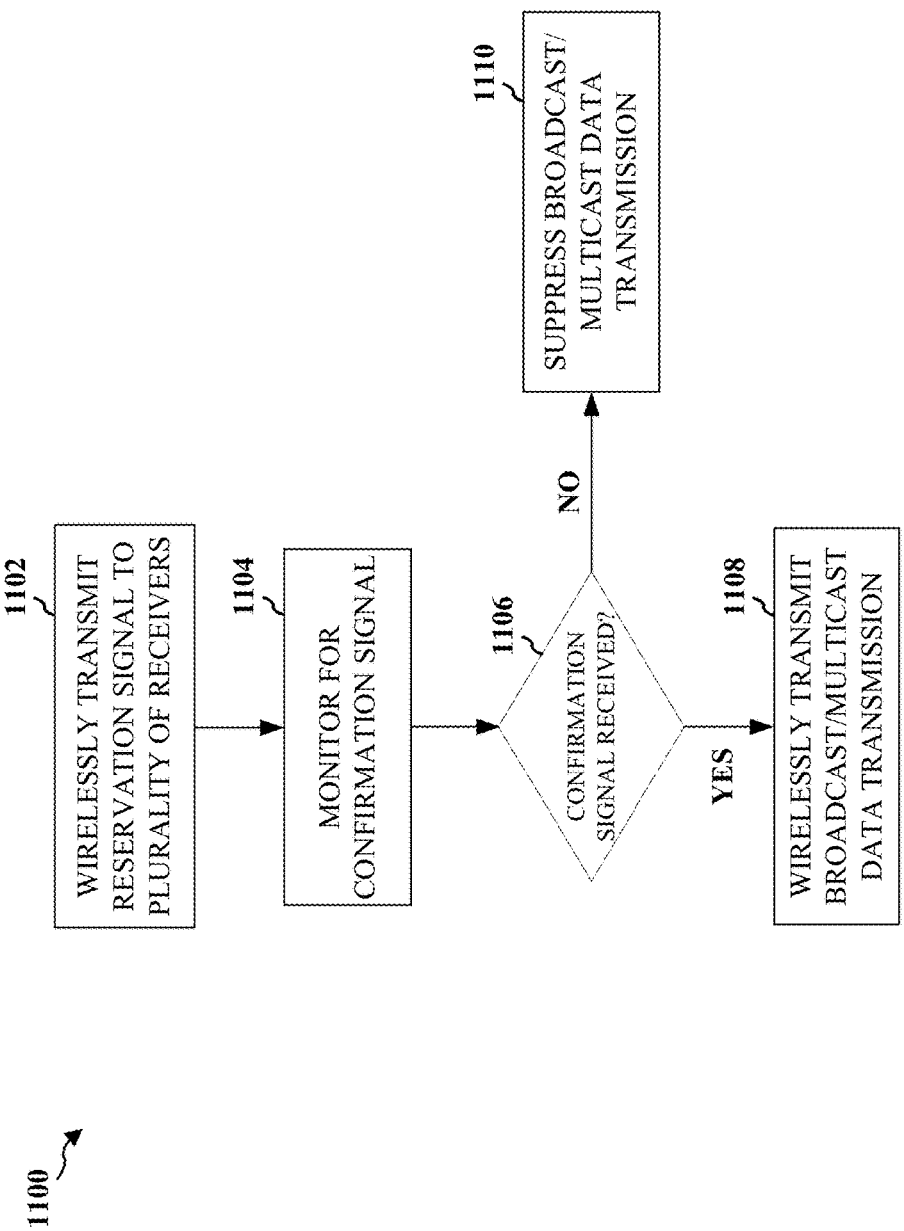
FIG. 11 is a flow chart of a method of wireless communication, according to one embodiment.

FIG. 11 is a flow chart 1100 of a method of wireless communication. The method may be performed by a UE. At step 1102, the UE sends a reservation signal intended for a plurality of receivers (e.g., other UEs) for scheduling a broadcast/multicast data transmission. At step 1104, the UE monitors for a confirmation signal from at least one of the plurality of receivers.

At step 1106, the UE determines whether the confirmation signal is received. At step 1108, when the confirmation signal is received, the UE sends the broadcast/multicast data transmission to the plurality of receivers. However, at step 1110, when the UE fails to receive the confirmation signal from at least one receiver, the UE suppresses transmission of the broadcast/multicast data to the plurality of receivers.

Figure 12:
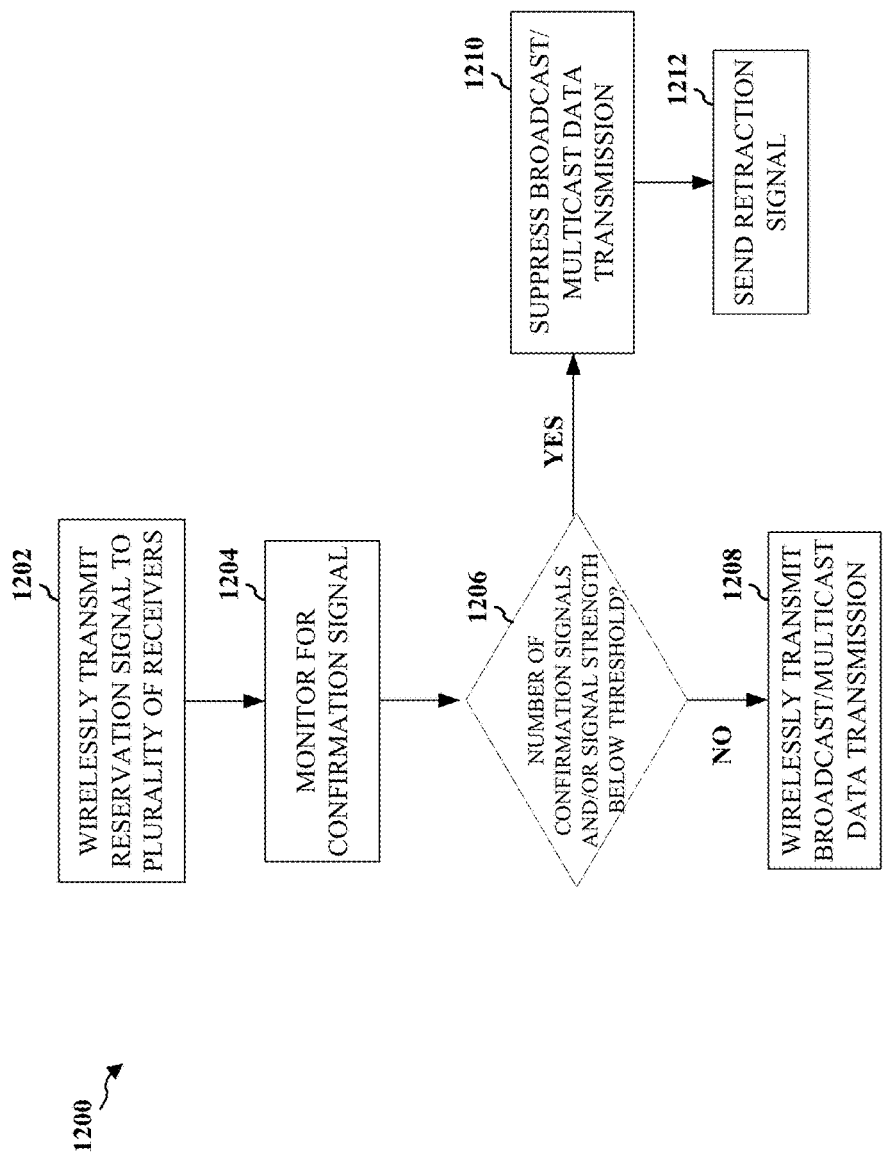
FIG. 12 is a flow chart of a method of wireless communication, according to one embodiment.

FIG. 12 is a flow chart 1200 of a method of wireless communication. The method may be performed by a UE. At step 1202, the UE sends a reservation signal intended for a plurality of receivers (e.g., other UEs) for scheduling a broadcast/multicast data transmission. The reservation signal may indicate that the reservation signal is intended for the plurality of receivers. The indication may be carried out via the contents of the reservation signal (e.g., a broadcast/multicast address or other information) and/or a position of the reservation signal in a resource block (e.g., positions of one or more resource elements in the resource block).

At step 1204, the UE monitors for a confirmation signal from at least one of the plurality of receivers. In an aspect, the confirmation signal may be monitored for on tone-symbols (e.g., resource elements) of a resource block different than the tone-symbols (e.g., resource elements) on which the reservation signal is sent. In a further aspect, confirmation signals from the plurality of receivers may be received relative to each other on a same tone-symbol of a resource block. For example, referring to FIG. 3, all received confirmation signals may be received on the same one of 84 tone-symbols constituting the resource block. The confirmation signals may also be received relative to each other on different tone-symbols across different symbols of a resource block. For example, referring to FIG. 3, the confirmation signals may be received on any number of 12 tones across any number of seven OFDM symbols constituting the resource block.

At step 1206, the UE determines whether a number of received confirmation signals and/or a signal strength of a received confirmation signal from the at least one of the plurality of receivers is below a threshold. At step 1208, when the number of received confirmation signals is above or equal to a threshold, the UE sends the broadcast/multicast data to the plurality of receivers. Alternatively or additionally, when the signal strength of a received confirmation signal is above or equal to a threshold, the UE sends the broadcast/multicast data to the plurality of receivers.

At step 1210, when the number of received confirmation signals is below a threshold, the UE suppresses the broadcast/multicast data transmission to the plurality of receivers. Alternatively or additionally, when the signal strength of a received confirmation signal is below a threshold, the UE also suppresses the broadcast/multicast data transmission to the plurality of receivers. At step 1212, the UE may send a retraction signal to the plurality of receivers to indicate the suppression of the broadcast/multicast data transmission.

Figure 13:
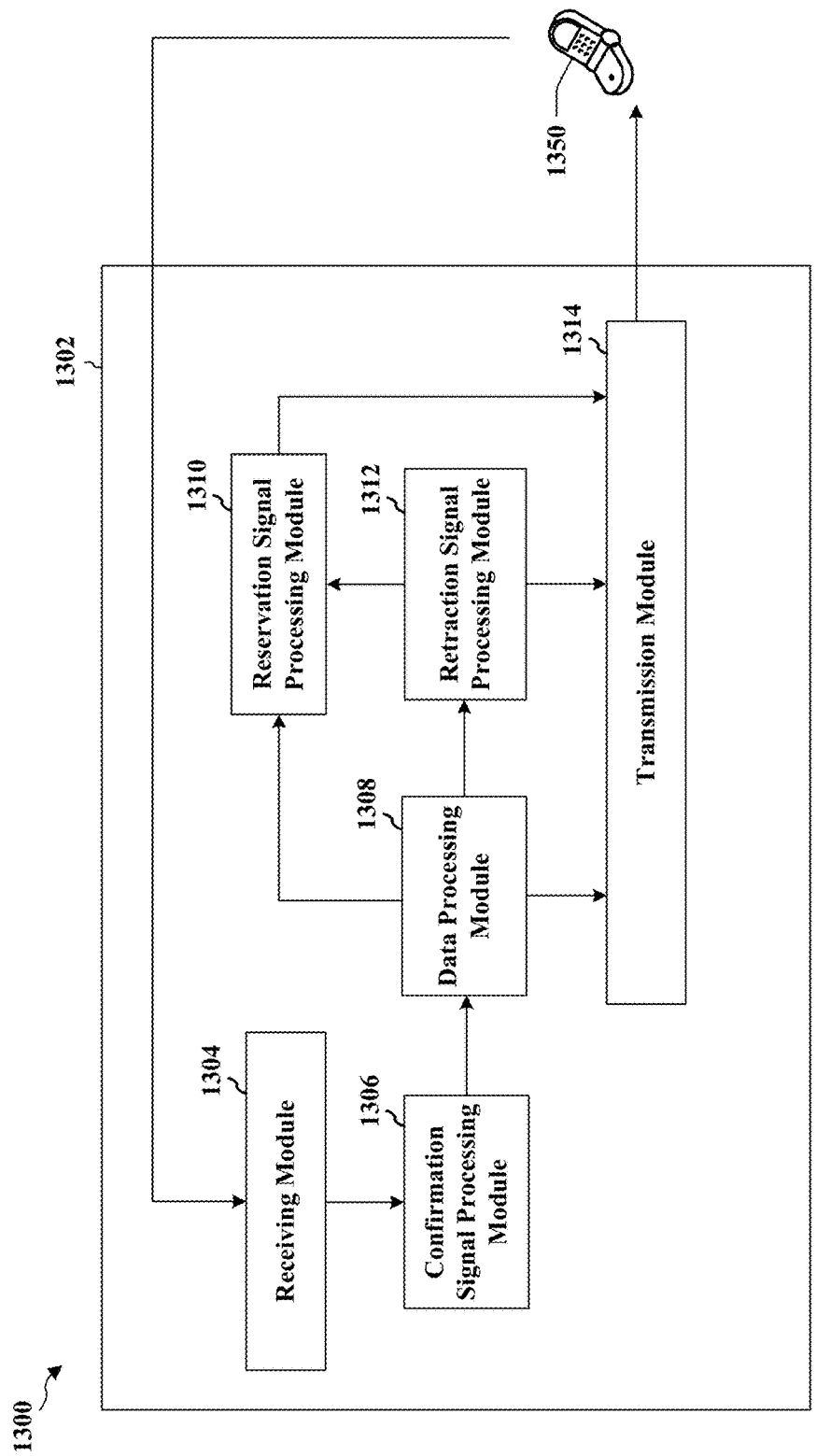
FIG. 13 is a conceptual data flow diagram illustrating the data flow between different modules/means/components in an exemplary apparatus, according to one embodiment.

FIG. 13 is a conceptual data flow diagram 1300 illustrating the data flow between different modules/means/components in an exemplary apparatus 1302. The apparatus may be a UE. The apparatus includes a receiving module 1304, a confirmation signal processing module 1306, a data processing module 1308, a reservation signal processing module 1310, a retraction signal processing module 1312, and a transmission module 1314.

The reservation signal processing module 1310 sends a reservation signal (e.g., via transmission module 1314) intended for a plurality of receivers for scheduling a broadcast/multicast data transmission. The reservation signal may indicate that the reservation signal is intended for the plurality of receivers. The indication may be carried out via the contents of the reservation signal and/or a position of the reservation signal in a resource block.

The confirmation signal processing module 1306 monitors (e.g., via receiving module 1304) for a confirmation signal from at least one of the plurality of receivers 1350 and determines whether the confirmation signal is received. In an aspect, the confirmation signal processing module 1306 may monitor for the confirmation signal on tone-symbols of a resource block different than the tone-symbols on which the reservation signal processing module 1310 sent the reservation signal. In a further aspect, the confirmation signal processing module 1306 may receive the confirmation signals relative to each other from the plurality of receivers on a same tone-symbol of a resource block. The confirmation signal processing module 1306 may alternatively receive the confirmation signals relative to each other on different tone-symbols across different symbols of a resource block.

In an aspect, when the confirmation signal processing module 1306 receives the confirmation signal, the data processing module 1308 sends (via transmission module 1314) the broadcast/multicast data transmission to the plurality of receivers 1350. However, when the confirmation signal processing module 1306 fails to receive the confirmation signal from at least one receiver 1350, the data processing module 1308 suppresses transmission of the broadcast/multicast data to the plurality of receivers 1350.

In another aspect, the confirmation signal processing module 1306 determines whether a number of received confirmation signals and/or a signal strength of a received confirmation signal from the at least one of the plurality of receivers is below a threshold. When the number of received confirmation signals is above or equal to a threshold, the data processing module 1308 sends the broadcast/multicast data to the plurality of receivers 1350. Alternatively, when the signal strength of a received confirmation signal is above or equal to a threshold, the data processing module 1308 sends the broadcast/multicast data to the plurality of receivers.

When the number of received confirmation signals is below a threshold, the data processing module 1308 suppresses the broadcast/multicast data transmission to the plurality of receivers. Alternatively, when the signal strength of a received confirmation signal is below a threshold, the data processing module 1308 suppresses the broadcast/multicast data transmission to the plurality of receivers. Finally, the retraction signal processing module 1312 may send a retraction signal (via transmission module 1314) to the plurality of receivers 1350 to indicate the suppression of the broadcast/multicast data transmission.

The apparatus may include additional modules that perform each of the steps of the algorithm in the aforementioned flow charts of FIGS. 10-11. As such, each step in the aforementioned flow charts of FIGS. 10-11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
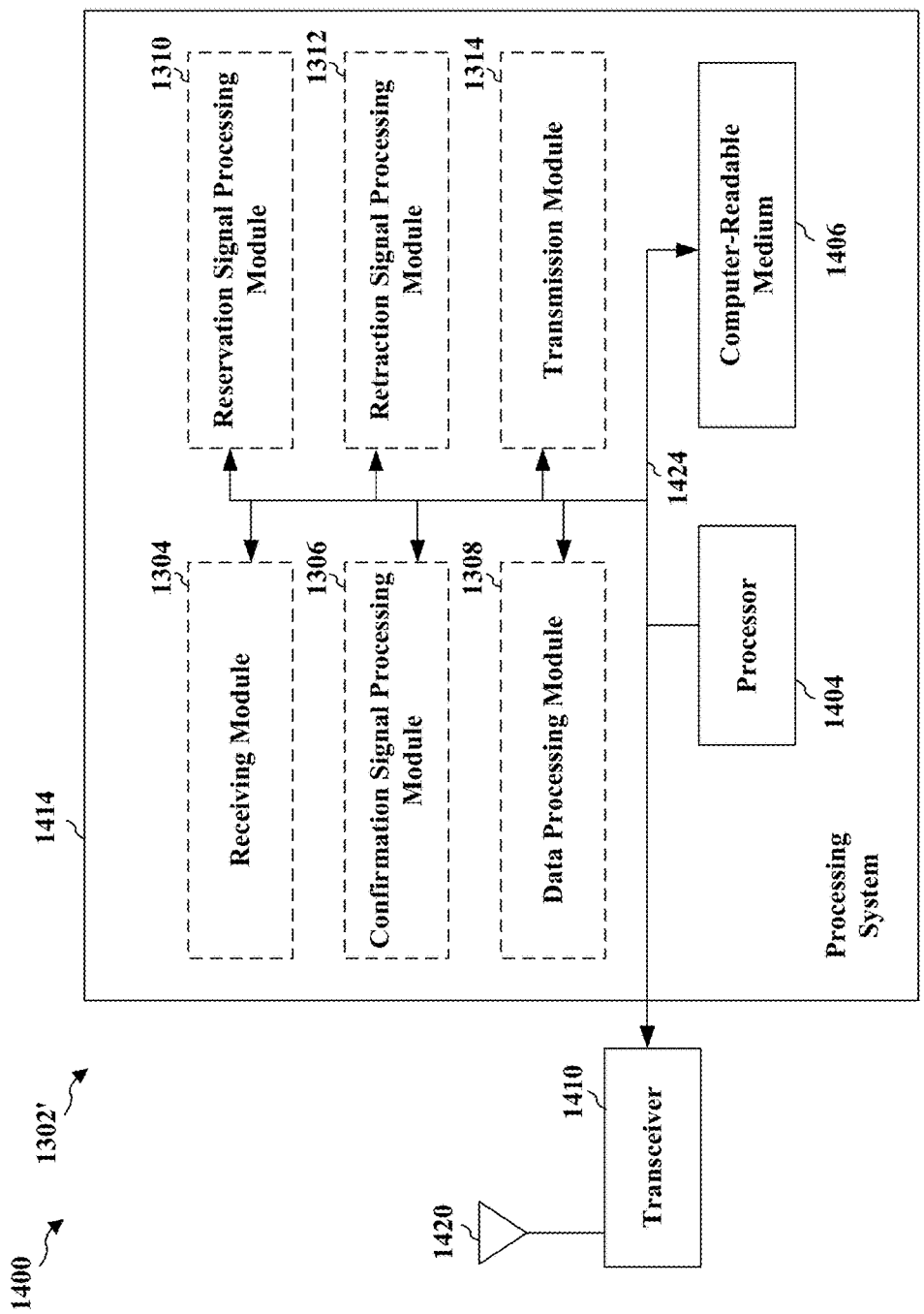
FIG. 14 is a diagram illustrating an example of a hardware implementation for an apparatus employing a processing system, according to one embodiment.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1304, 1306, 1308, 1310, 1312, 1314 and the computer-readable medium 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system 1414 may further include at least one of the modules 1304, 1306, 1308, 1310, 1312, and 1314. In an embodiment, the transceiver 1410 may include the receiving module 1304 and the transmission module 1314. Accordingly, upon receipt of a wireless signal, the transceiver 1410 may implement the receiving module 1304 to decode and/or demodulate the received signal into a form suitable for processing by the various modules of the processing system 1414. The transceiver 1410 may also implement the transmission module 1314 to code and/or modulate data produced by the various modules of the processing system 1414 into a form suitable for wireless transmission. The modules may be software modules running in the processor 1404, resident/stored in the computer readable medium 1406, one or more hardware modules coupled to the processor 1404, or some combination thereof. The processing system 1414 may be a component of the UE 650 and may include the memory 660 and/or at least one of the TX processor 668, the RX processor 656, and the controller/processor 659.

In one configuration, the apparatus 1302/1302' for wireless communication includes means for sending a reservation signal to a plurality of receivers for scheduling a broadcast/multicast data transmission, means for monitoring for a confirmation signal from at least one of the plurality of receivers, means for sending the broadcast/multicast data transmission to the plurality of receivers when the confirmation signal is received, means for suppressing transmission of the broadcast/multicast data to the plurality of receivers when the confirmation signal is not received, means for determining at least one of a number of received confirmation signals or a signal strength of a received confirmation signal from the at least one of the plurality of receivers, means for suppressing transmission of the broadcast/multicast data based on the determined at least one of the number of received confirmation signals or the signal strength of the received confirmation signal, and means for sending a retraction signal to the plurality of receivers indicating the suppression of the broadcast/multicast data transmission.

The aforementioned means may be one or more of the aforementioned modules of the apparatus 1302 and/or the processing system 1414 of the apparatus 1302' configured to perform the functions recited by the aforementioned means. As described supra, the processing system 1414 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
    wirelessly transmitting a reservation signal intended for a plurality of receivers for scheduling a broadcast/multicast data transmission;
    monitoring for confirmation signals from the plurality of receivers;
    determining a number of confirmation signals and a signal strength of each of the confirmation signals, received in response to the reservation signal for scheduling the broadcast/multicast data transmission, from the plurality of receivers;
    wirelessly transmitting the broadcast/multicast data transmission to the plurality of receivers based on a first comparison of the number of received confirmation signals to a first threshold and based on a second comparison of the signal strength of each of the received confirmation signals to a second threshold; and
    wirelessly transmitting a retraction signal to the plurality of receivers based on the first comparison of the number of received confirmation signals to the first threshold and based on the second comparison of the determined signal strength of each of the received confirmation signals to the second threshold, the retraction signal indicating suppression of the broadcast/multicast data transmission.

2. The method of claim 1, further comprising suppressing transmission of the broadcast/multicast data to the plurality of receivers based on the first comparison of the number of received confirmation signals to the first threshold and based on the second comparison of the determined signal strength of each of the received confirmation signals to the second threshold.

3. The method of claim 1, wherein the confirmation signals are received, relative to each other, on a same tone-symbol of a resource block.

4. The method of claim 1, wherein the confirmation signals are received, relative to each other, on different tone-symbols across different symbols of a resource block.

5. The method of claim 1, wherein the reservation signal further indicates the intention by a reservation signal content.

6. The method of claim 1, wherein the reservation signal is sent, and the confirmation signal is monitored for, on different tone-symbols of a resource block.

7. The method of claim 1, wherein the reservation signal indicates that the reservation signal is intended for the plurality of receivers by a position in a resource block.

8. The method of claim 1, wherein:
    the broadcast/multicast data transmission is wirelessly transmitted when the number of received confirmation signals is greater than or equal to the first threshold and when the determined signal strength of each of the received confirmation signals is greater than or equal to the second threshold, and
    the retraction signal is wirelessly transmitted when the number of received confirmation signals is less than the first threshold and when the determined signal strength of each of the received confirmation signals is less than the second threshold.

9. The method of claim 1, wherein the first threshold is a minimum number of received confirmation signals, and wherein the second threshold is a minimum signal strength of each of the received confirmation signals.

10. An apparatus for wireless communication, comprising:
    means for wirelessly transmitting a reservation signal intended for a plurality of receivers for scheduling a broadcast/multicast data transmission;
    means for monitoring for confirmation signals from the plurality of receivers;
    means for determining a number of confirmation signals and a signal strength of each of the confirmation signals, received in response to the reservation signal for scheduling the broadcast/multicast data transmission, from the plurality of receivers;
    means for wirelessly transmitting the broadcast/multicast data transmission to the plurality of receivers based on a first comparison of the number of received confirmation to a first threshold and based on a second comparison of the signal strength of each of the received confirmation signals to a second threshold; and
    means for wirelessly transmitting a retraction signal to the plurality of receivers based on the first comparison of the number of received confirmation signals to the first threshold and based on the second comparison of the determined signal strength of each of the received confirmation signals to the second threshold, the retraction signal indicating suppression of the broadcast/multicast data transmission.

11. The apparatus of claim 10, further comprising means for suppressing transmission of the broadcast/multicast data to the plurality of receivers based on the first comparison of the number of received confirmation signals to the first threshold and based on the second comparison of the determined signal strength of each of the received confirmation signals to the second threshold.

12. The apparatus of claim 10, wherein the confirmation signals are received, relative to each other, on a same tone-symbol of a resource block.

13. The apparatus of claim 10, wherein the confirmation signals are received, relative to each other, on different tone-symbols across different symbols of a resource block.

14. The apparatus of claim 10, wherein the reservation signal further indicates the intention by a reservation signal content.

15. The apparatus of claim 10, wherein the reservation signal is sent, and the confirmation signal is monitored for, on different tone-symbols of a resource block.

16. The apparatus of claim 10, wherein the first threshold is a minimum number of received confirmation signals, and wherein the second threshold is a minimum signal strength of each of the received confirmation signals.

17. An apparatus for wireless communication, comprising:
a memory; and
at least one processor coupled to the memory and configured to:
wirelessly transmit a reservation signal intended for a plurality of receivers for scheduling a broadcast/multicast data transmission;
monitor for confirmation signals from the plurality of receivers;
determine a number of confirmation signals and a signal strength of each of the confirmation signals, received in response to the reservation signal for scheduling the broadcast/multicast data transmission, from the plurality of receivers;
wirelessly transmit the broadcast/multicast data transmission to the plurality of receivers based on a first comparison of the number of received confirmation to a first threshold and based on a second comparison of the signal strength of each of the received confirmation signals to a second threshold; and
wirelessly transmit a retraction signal to the plurality of receivers based on the first comparison of the number of received confirmation signals to the first threshold and based on the second comparison of the determined signal strength of each of the received confirmation signals to the second threshold, the retraction signal indicating suppression of the broadcast/multicast data transmission.

18. The apparatus of claim 17, wherein the at least one processor is further configured to suppress transmission of the broadcast/multicast data to the plurality of receivers based on the first comparison of the number of received confirmation signals to the first threshold and based on the second comparison of the determined signal strength of each of the received confirmation signals to the second threshold.

19. The apparatus of claim 17, wherein the confirmation signals are received, relative to each other, on a same tone-symbol of a resource block.

20. The apparatus of claim 17, wherein the confirmation signals are received, relative to each other, on different tone-symbols across different symbols of a resource block.

21. The apparatus of claim 17, wherein the reservation signal further indicates the intention by a reservation signal content.

22. The apparatus of claim 17, wherein the reservation signal is sent, and the confirmation signal is monitored for, on different tone-symbols of a resource block.

23. The apparatus of claim 17, wherein the first threshold is a minimum number of received confirmation signals, and wherein the second threshold is a minimum signal strength of each of the received confirmation signals.

24. A non-transitory computer-readable medium storing computer executable code for wireless communication, the code, when executed by at least one processor, to cause a computing device to:
wirelessly transmit, by a wireless communication device, a reservation signal intended for a plurality of receivers for scheduling a broadcast/multicast data transmission;
monitor, by the wireless communication device, for confirmation signals from the plurality of receivers;
determine, by the wireless communication device, a number of confirmation signals and a signal strength of each of the confirmation signals, received in response to the reservation signal for scheduling the broadcast/multicast data transmission, from the plurality of receivers;
wirelessly transmit, by the wireless communication device, the broadcast/multicast data transmission to the plurality of receivers based on a first comparison of the number of received confirmation signals to a first threshold and based on a second comparison of the signal strength of each of the received confirmation signals to a second threshold; and
wirelessly transmit a retraction signal to the plurality of receivers based on the first comparison of the number of received confirmation signals to the first threshold and based on the second comparison of the determined signal strength of each of the received confirmation signals to the second threshold, the retraction signal indicating suppression of the broadcast/multicast data transmission.

25. The non-transitory computer-readable medium of claim 24, further comprising code to suppress transmission of the broadcast/multicast data to the plurality of receivers based on the first comparison of the number of received confirmation signals to the first threshold and based on the second comparison of the determined signal strength of each of the received confirmation signals to the second threshold.

26. The non-transitory computer-readable medium of claim 24, wherein the confirmation signals are received, relative to each other, on a same tone-symbol of a resource block.

27. The non-transitory computer-readable medium of claim 24, wherein the confirmation signals are received, relative to each other, on different tones of different symbols of a resource block.

28. The non-transitory computer-readable medium of claim 24, wherein the reservation signal further indicates the intention by a reservation signal content.

29. The non-transitory computer-readable medium of claim 24, wherein the reservation signal is sent, and the confirmation signal is monitored for, on different tone-symbols of a resource block.

30. The non-transitory computer-readable medium of claim 24, wherein the first threshold is a minimum number of received confirmation signals, and wherein the second threshold is a minimum signal strength of each of the received confirmation signals.

* * * * *